June 24, 1952 L. Y. LACY 2,601,403

ELECTRIC CIRCUIT

Filed March 19, 1948

INVENTOR
L. Y. LACY
BY P. J. Roche
ATTORNEY

Patented June 24, 1952 2,601,403

UNITED STATES PATENT OFFICE 2,601,403

ELECTRIC CIRCUIT

Lester Y. Lacy, Madison, N. J., assignor to Bell Telephone Laboratories, Incorporated, New York, N. Y., a corporation of New York Application March 19, 1948, Serial No. 15,930

7 Claims. (Cl. 235—92)

Figure 1:
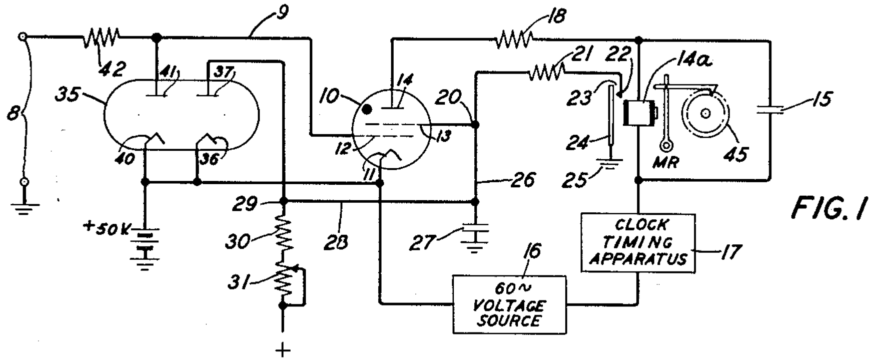

This invention relates to an electric circuit including a gaseous discharge device arranged to ionize and deionize in response to certain voltage conditions in the circuit for effecting counting operations.

Noise occurring at contact members adapted to engage and disengage each other in the switching offices of automatic telephone systems tends to impair voice transmission. This tends to annoy subscribers and cause them to make frequent complaints based on noisy circuits. At the present time the magnitudes of such contact noise are observed as visual indications on a meter and thereafter manually recorded. These observations and recordings are often subject to considerable variations due to such factors in the maintenance personnel as fatigue, difference in efficiency, difference in vision, etc.

The present invention contemplates an electric circuit for automatically ascertaining the frequency of occurrence of contact noise of at least a certain magnitude in a telephone system.

It is the main object of the invention to count automatically the number of time intervals in a given testing period in which the noise occurring at disengageable contact members in a telephone switching system attains at least a certain magnitude.

It is another object to count such time intervals when contact noise is substantially constant in magnitude.

It is also another object to count such time intervals when the contact noise is varying in magnitude.

It is a further object to limit each counting interval in the given testing period approximately to the same minimum time.

It is still another object to control the sensitivity of ionization of a gaseous discharge device.

It is still another object to provide a predetermined number of counting intervals, each having approximately the same minimum time duration, in a given testing period of time.

In a specific embodiment, the invention comprises, in combination, a circuit having a voltage of a steady or a varying magnitude, a counting mechanism including an operating winding and a first capacitor connected in shunt thereto, a gaseous discharge device having a control electrode connected to the input circuit, a screen grid, a cathode, and an anode, a source of alternating voltage connected to the anode and cathode and including the operating winding and first capacitor therebetween, a timing apparatus for rendering the alternating voltage effective for a given testing period, a second capacitor for applying a voltage of predetermined maximum magnitude to the screen grid and adapted to be charged and discharged under control of the counting mechanism, a first non-linear element for limiting the voltage applied to the screen grid to the predetermined magnitude, a second non-linear element for limiting the voltage applied to the control grid of the gaseous device from the input circuit to a certain maximum magnitude.

In the operation of the specific embodiment of the invention, the gaseous device is alternately ionized and deionized on a predetermined number of successive positive and negative half-cycles of the alternating voltage when voltages of predetermined and certain magnitudes are simultaneously applied to the screen and control grids, respectively, of the gaseous device whereby the first capacitor is charged to energize the operating winding of the counting mechanism and thereby operate this mechanism. This operation discharges the second capacitor which commences to take on another charge when the counting mechanism is returned to the undischarged condition, in preparation for effecting the next operation of the counting mechanism. The two non-linear elements limit the operations of the counting mechanism to a predetermined maximum number in the given testing period. Each operation of the counting mechanism indicates one time interval in which the voltage in the circuit connected to the control grid of the gaseous device attains at least a certain magnitude, and the total operations of the counting mechanism indicate the number of time intervals, each of at least a minimum time duration, in which the voltage in the control grid circuit attains at least the certain magnitude in a given testing period.

A feature of the invention resides in an arrangement whereby the ionization and deionization of the gaseous device effects the operation of the counting mechanism only in response to the simultaneous occurrence of control grid and screen grid voltages of the same order of magnitude. Another feature involves the use of a gaseous device to control the operation of a counting mechanism which in turn controls the ionization and deionization of the gaseous device. Another aspect relates to the use of one non-linear element for limiting to a predetermined magnitude the charge on the capacitor connected to the screen grid of the gaseous device thereby limiting the voltage applied to its screen grid by this capacitor to such magnitude. This tends to control the sensitivity of ionization of the gaseous device. Another feature resides in the use of a second non-linear element for limiting the voltage applied to the control grid of the gaseous discharge device to a certain magnitude. A further feature concerns the use of the two non-linear elements for limiting each counting time interval in a given testing period to the same predetermined minimum duration. Still another feature involves a timing arrangement for limiting the operation of a counting mechanism to one occasion in each of a predetermined number of time intervals, each of the same minimum duration, in a given testing period in which the voltage applied to the control grid of the gaseous device attains at least a certain magnitude. Or, in other words, the last-mentioned feature involves means for dividing a given testing period into a plurality of discrete testing intervals, each of the same minimum duration. This timing arrangement, in a still further aspect, effects the operation of the counting mechanism for control grid voltages having a steady and/or a varying magnitude.

Figure 2:
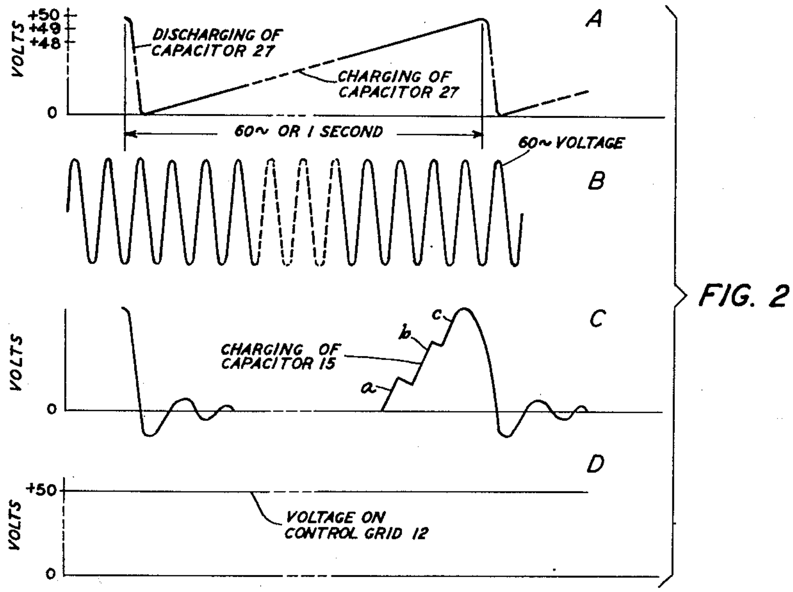
Figure 3:
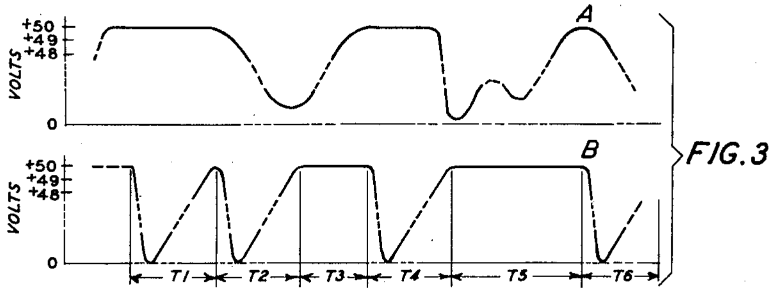

The invention will be readily understood from the following description when taken together with the accompanying drawing in which:

Fig. 1 is a schematic circuit illustrating a specific embodiment of the invention in an electric circuit including a gaseous discharge device; and Figs. 2 and 3 illustrate certain action obtainable in Fig. 1.

Referring to Fig. 1, a gaseous discharge circuit comprises a gaseous discharge device 10 including a cathode 11, a control grid 12, a screen grid 13 and an anode 14; an electromagnetic relay comprising in one form a message register MR of a well-known type as used in telephone systems and having an operating winding 14*a*, a capacitor 15 in shunt thereto, and a pawl and ratchet counter 45 of well known type; a clock timing apparatus 17; and a source of alternating voltage 16 connected across the anode and cathode circuit and including the timing apparatus and the shunt arranged operating winding and capacitor therebetween. A resistor 18 of small value is inserted between the anode 14 and capacitor 15 to limit the amount of anode current when the gaseous tube is ionized in a manner that will appear subsequently. The control grid 12 is connected via lead 9 to an input circuit 8. The timing apparatus serves to render the alternating source effective in the anode-cathode circuit for a given testing period whose amount and purpose will be explained hereinafter. The capacitor 15 will be charged to an extent and for a purpose that will be explained later herein.

The cathode 11 of the gaseous device 10 is maintained at a fixed potential with reference to ground, say +50 volts for the purpose of this explanation, by a suitable voltage source as shown, and its screen grid 13 is connected via terminal 20 and resistor 21 to a side 22 of a normally open contact 23 associated with the message register MR. This contact further includes an armature 24 having its upper end associated with the side 22 and its lower end connected to a ground point 25.

The terminal 20 is also connected via lead 26 to one side of a capacitor 27 whose opposite side is grounded. The screen grid side of the latter capacitor is connected by lead 28 to a terminal

29 which is further connected through a serially arranged resistor 30 and potentiometer 31 to a source of positive potential, not shown. It will be understood that at least a predetermined charge, say +50 volts above ground for the purpose of this description, may be placed on the capacitor 27 in a preselected time interval by adjustment of the potentiometer 31. Obviously, the charge on capacitor 27 is effectively applied to the screen grid of the gaseous device because of the normally open contact 23 associated with message register MR. The charge on capacitor 27 may be drained off via the ground point 25 when the contact 23 is closed due to the operation of the message register MR in a manner that will be hereinafter explained.

In double diode 35 of the RCA 6H6 type, the right-hand diode has its cathode 36 connected to the cathode 11 of the gaseous device so as to be biased to +50 volts above ground, and its anode to the terminal 29 and thereby to the screen grid side of the capacitor 27 as well as to the resistor 30 and potentiometer 31 disposed in the charging circuit therefor. Thus, the right-hand diode 36—37 is effectively connected in shunt to the capacitor 27 with reference to the resistor 30 and potentiometer 31 in the charging circuit therefor. The diode 36—37 plays no part in the functioning of the charging circuit of the capacitor 27 until the charge thereon tends to exceed the predetermined value of +50 volts whereupon the charging current is shunted through this diode. This tends to prevent the charge on the capacitor 27 from exceeding the predetermined value of +50 volts thereby tending substantially to maintain the sensitivity of the discharge of the gaseous device at the +50 volts as will be seen hereinafter.

In the double diode 35, the left-hand diode has its cathode 40 connected to the cathode 11 of the gaseous device so as to be biased to +50 volts above ground, and its anode 41 to the lead 9 and thereby to the input circuit 8 and the control grid of the gaseous device. Thus, the diode 40—41 is effectively connected in parallel with the control grid-cathode circuit of the gaseous device 10 with reference to the input circuit 8. The diode 40—41 plays no part in the operation of the input circuit 8 until the voltage therein attains at least a certain value, say +50 volts above ground for the purpose of this explanation, whereupon the input current is shunted through the diode 40—41. Resistor 42 inserted in the input circuit serves to limit the effective current in the input current 8 so that the voltage at anode 41 of the double diode 35 cannot exceed approximately the +50 volts. This limitation tends to preclude the input voltage as applied to the control grid from exceeding the predetermined value of +50 volts, and thereby to substantially maintain the ionized periods of the gaseous device at fixed minimum time intervals as will be pointed out later. The voltage in the input circuit 8 comprises a rectified and amplified voltage which is proportional, for the purpose of this description, to the noise at disengageable contact members in a switching office of an automatic telephone system as heretofore mentioned, not shown. Obviously, the double diode 35 may comprise individual diode envelopes without changing their function in the circuit.

The operation of Fig. 1 is arranged to record the number of time intervals in a given testing period in which the voltage in the input circuit 8 attains at least the certain value of +50 volts in the following manner:

Let it be assumed in Fig. 1 for the purpose of this description that the clock timing apparatus is adjusted to render the 60-cycle voltage effective in the previously identified anode-cathode circuit of the gaseous device for a 50-second testing period; the biasing voltages of +50 volts are being applied to the cathodes 11, 36 and 40 of the respective gaseous device and double diode; and the charging interval for the capacitor 27 shown in Fig. 2A has just begun, each associated charging and discharging interval of this capacitor being assumed to take place in one second as will be mentioned later herein.

As the charge on capacitor 27 approaches the predetermined +50 volts, say +48 volts, during an instant when a positive half-cycle of the 60-cycle voltage, Fig. 2B, is effective in the anode-cathode circuit of the gaseous device, the latter will ionize or fail to ionize depending on the magnitude of the voltage applied to the control grid thereof, i. e. on the magnitude of the voltage effective in the input circuit 8. Let it be further assumed for the purpose of this description that the voltage applied to the control grid of the gaseous device at this instant has attained approximately the certain magnitude of +50 volts as shown in Fig. 2D. This means that the magnitude of the voltage in the input circuit 8 is at least the certain +50 volts, but may exceed this amount as will be further mentioned subsequently.

In response to the above voltages assumed in Fig. 1, the gaseous device will ionize on the positive half-cycle of the 60-cycle voltage effective at that instant in its anode-cathode circuit. As a consequence, current will flow during that particular positive half-cycle of the 60-cycle voltage in a circuit including anode-cathode of the gaseous device, winding 14*a* and capacitor 15, timing apparatus, and 60-cycle voltage source; but this current flow will be terminated on the next succeeding negative half-cycle of the 60-cycle voltage due to the return of the gaseous device to the deionized condition. However, during the ionization of the gaseous device, the capacitor 15 will take on a small charge *a* as shown in Fig. 2C due to the particular positive half-cycle of the 60-cycle current flowing in the above-traced circuit, but will tend to discharge through the winding 14*a* when the gaseous device is returned to the deionized condition. At this point it will be understood that such discharge current of capacitor 15 is inadequate to operate the message register MR; and further that the amount of current flowing in the winding 14*a* due to the positive half-cycle of 60-cycle current flowing in the above-traced circuit during the ionization of the gaseous device is also inadequate to operate the message register MR.

On the next succeeding positive half-cycle of the 60-cycle voltage, the gaseous device will again ionize as the initially assumed voltages still obtain except the capacitor 27 will now be assumed to attain a charge of approximately +49 volts. As a consequence, the capacitor 15 will take on a second small charge *b* as shown in Fig. 2C, the ionization of the gaseous device will be terminated, and the capacitor 15 will tend to discharge in the manner previously explained. On the next succeeding positive and negative cycles of the 60-cycle voltage, assuming the initial voltage conditions still obtain except the charge on the capacitor 27 is now assumed to be approximately +50 volts, the gaseous device will ionize and deionize whereby a third small charge *c* is placed on the capacitor 15, as shown in Fig. 2C, in the manner above described.

After the ionization in the gaseous device has been quenched for the third successive time, the capacitor 15 will tend again to discharge through the operating winding of the message register MR, but this time will operate it. This is so because the voltage charge accumulated on the capacitor 15 is adequate for this purpose. This operation of the message register MR moves its armature 24 into engagement with its associated side 22 to close the normally open contact 23. This connects ground 25 to terminal 20 which is common to screen grid of the gaseous device and to capacitor 27 whereby control of the next succeeding discharge of the gaseous device is restored immediately to this grid, and whereby at the same time the discharge of capacitor 27 is effected. Restoration of such control to this screen grid is due to the fact that the latter is now at a negative potential with reference to its associated cathode. Referring to Fig. 2A it will be seen that each associated charge-discharge interval of the capacitor 27 requires approximately one second; and each operation of the message register MR disables the counting mechanism substantially for the 1-second period. It is therefore evident that the voltage in the input circuit 8 was at least +50 volts at the time of the discharge of the capacitor 27 or at the start of the particular timing interval of one second.

The foregoing operation of the message register MR actuates its counter 45 associated therewith in the well-known manner to indicate that voltage in the input circuit 8 had attained at least the certain magnitude of +50 volts at the start of the first 1-second interval in the given 50-second testing interval.

Once the voltage discharge of capacitor 15 falls below the value necessary to continue the operation of the message register MR, the armature 24 disengages from its associated side 22 to restore contact 23 to the normally open condition thereby removing the ground point 25 from the capacitor 27. This so conditions the circuit of Fig. 1 that the capacitor 27 commences to take on another charge. Again, when the charge on capacitor 27 approaches the values of +48, +49 and +50 volts and the voltage in the input circuit attains at least the certain magnitude of +50 volts as previously mentioned, the gaseous device will ionize to cause a second operation of the message register MR in the manner just described. This operation of the message register records a second 1-second interval in the given 50-second testing period in which the voltage in the input circuit 8 attains at least the certain magnitude of +50 volts.

The foregoing action resulting in the operation of the message register MR may be repeated once each second in the remaining time of the given 50-second testing period so long as the voltage in the input circuit 8 attains at least the certain magnitude of +50 volts. Hence, the message register MR will record, in the above manner, fifty 1-second intervals in the given 50-second testing period in which the voltage in the input circuit 8 attains at least the certain magnitude of +50 volts.

According to the foregoing operation, the predetermined charge of +48, +49 or +50 volts on capacitor 27 tends to fix the sensitivity of the discharge of the gaseous device and this sensitivity tends to be maintained by the action of the right-hand diode 36—37 in the double diode 35 in the manner hereinbefore described. The action of the left-hand diode 40—41 in the double diode 35 tends to limit the voltage applied to the control grid of the gaseous device substantially to the certain magnitude of +50 volts, regardless of the magnitude of the voltage effective in the input circuit 8 thereby tending to maintain each associated charge and discharge of the capacitor 27 to the minimum 1-second interval which was initially assumed. Thus, the action of the two diodes tends to divide the given 50-second testing period into fifty 1-second testing intervals thereby limiting the operations of the message register MR to a predetermined maximum number of fifty in the given 50-second testing period.

It will be understood that it is unnecessary for the voltage in the input circuit 8 to remain at the certain magnitude of +50 volts for each entire 1-second interval but must have attained substantially such value at the instant when the charge on capacitor 27 attains approximately its predetermined value of +50 volts in the manner hereinbefore explained. Obviously, the voltage in the input circuit 8 need not be steady in magnitude but may be, and very often is, of varying magnitude. This will be clear from the description that comes hereinafter.

Accordingly, it may happen in the circuit of Fig. 1 that the magnitude of the voltage in the input circuit 8 may vary widely during the 50-second testing period so that the magnitude of the voltage applied to the control grid of the gaseous device, when the capacitor 27 has attained approximately the predetermined charge of +50 volts, is sometimes of the order of the certain magnitude of +50 volts and sometimes less than this amount. As a consequence the circuit of Fig. 1 is also arranged to record, at a rate not to exceed once per second, the number of intervals in the given 50-second testing period in which the voltage varying in magnitude in the input circuit 8 attains at least the certain magnitude of +50 volts in the following manner.

Let it be assumed again that the conditions of approximately +50 volts for the input circuit 8 and capacitor 27 occur in the circuit of Fig. 1 so that the message register MR is operated in the manner aforementioned once at the beginning of the time $T_1$ and again at the end of the time $T_1$ or the beginning of the time $T_2$ as shown in Figs. 3A and B. This means that the voltage in the input circuit 8 attained at least the certain magnitude of +50 volts at the start of the two successive time intervals of $T_1$ and $T_2$, each of which includes the minimum time of one second required for each charge-discharge interval of capacitor 27 as above explained.

At the end of the 1-second interval $T_2$ or the beginning of the interval $T_3$, however, the voltage in the input circuit 8 is below the certain magnitude of +50 volts and the capacitor 27 has the predetermined +50 volt charge thereon as shown in Figs. 3A and B. As a consequence the gaseous device will not ionize. At the same time, it will be understood that the action of the right-hand diode 36—37 of the double diode 35 tends to limit the maximum charge on capacitor 27 approximately to the predetermined +50 volts in the manner hereinbefore described. This condition obtains until toward the end of the time interval $T_3$ when the voltage in the input circuit 8 approaches its certain magnitude of +50 volts. In this case, the capacitor 15 is again charged in the three steps shown in Fig. 2C in a manner which is similar to that mentioned previously for the initially assumed conditions in Fig. 1. This charging of capacitor 15 will now be explained.

As the voltage in input circuit 8 attains a value, say for example, approximately +48 volts toward the end of time $T_3$ during an instant when a positive half-cycle of 60-cycle voltage is effective in the anode-cathode circuit of the gaseous device and a charge of approximately +50 volts is placed on the capacitor 27, the gaseous device will ionize to institute a flow of current in the above-traced anode-cathode circuit thereof, and will be deionized on the next succeeding negative half-cycle of the 60-cycle voltage. During this ionization of the gaseous device, the capacitor 15 will take on its first step *a* of charge as shown in Fig. 2C. On the next succeeding positive and negative half-cycles of the 60-cycle voltage when the voltage in the input circuit 8 is approximately +49 volts toward the end of time $T_3$, the capacitor 15 will take on its second step *b* of charge as shown in Fig. 2C. On the next succeeding positive and negative half-cycles of the 60-cycle voltage when the voltage in the input circuit 8 is approximately +50 volts toward the end of time $T_3$, the capacitor 15 will take on its third step *c* of charge as shown in Fig. 2C. This, as above pointed out, will provide sufficient voltage charge on capacitor 15 to effect the third operation of the message register MR thereby recording the third time interval in the 50-second testing period in which the voltage in the input circuit 8 attains at least the certain magnitude of +50 volts. Now, it will be observed in Fig. 3 that the third operation of the message register MR is not effected until the end of the time interval $T_3$ or the beginning of the time interval $T_4$. However, it will now be evident that substantially the time $T_2+T_3$ is required to effect the third operation of the message register MR.

Next, in Fig. 3, it will be noticed that the capacitor 27 again discharges and attains the predetermined charge of +50 volts approximately at the end of the 1-second interval $T_4$ but again the voltage in the input circuit 8 is below the certain magnitude of +50 volts and does not approach the latter magnitude to ionize the gaseous device until the end of the time interval $T_5$ or beginning of the time interval $T_6$. The message register MR is operated a fourth time in the manner just explained to record a fourth time interval in which the voltage in the input circuit 8 attains at least the certain magnitude of +50 volts. Now, it will be observed in Fig. 3 that approximately the time interval $T_4+T_5$ is required to operate the message register whereas different amounts of time were required for this purpose as previously pointed out. It will be understood for this explanation that the time intervals $T_1+T_2+T_3+T_4+T_5$ consume only a portion of the given 50-second testing period, although it will be obvious that these time intervals may constitute the entire testing period. During the remaining portion of the testing period, if any, it may happen that the message register MR is operated one or more times in accordance with the voltage variations in the input circuit 8 in the 1-second intervals of Fig. 2 or in the random time intervals of Fig. 3. At the end of this 50-second testing period, the total operations of the message register MR will record and thereby indicate a number of intervals, each of not less than 1-second duration, in which the voltage in the input circuit 8 attains at least the certain magniture of +50 volts. From Fig. 3 it will be evident that it is unnecessary for the voltage in the input circuit 8 to remain at the certain magnitude of at least +50 volts for the entire duration of the 50-second timing interval but this voltage must have such magnitude at the commencement of each 1-second interval in the 50-second testing period and may have a lesser magnitude during the remainder of each latter interval.

While the foregoing explanation regarding Figs. 1, 2 and 3 indicates a gradual increase in the magnitude of the voltage in the input circuit 8 up to and including the certain magnitude of +50 volts would appear to be required for the purpose of charging capacitor 15, it will be understood that the same operation to charge the capacitor 15 would obtain if such input voltage achieved the maximum magnitude of +48 volts and continued thereat during the remainder of the charging interval for the capacitor 15. Thus, a minimum certain voltage of +48 volts in the input circuit 8 together with the predetermined charge of +50 volts on capacitor 27 or a minimum certain voltage of +48 volts in the input circuit 8 together with a minimum predetermined charge of +48 volts on the capacitor 27 would be adequate to ionize the gaseous device to charge the capacitor 15 and thereby operate the message register MR in the manner previously explained. Also, it will be obvious that a sufficient charge may be placed on capacitor 15 during each single ionization of the gaseous device or any member of ionization thereof in order to operate the message register MR, if it is so desired.

While the specific embodiment of the invention has been selected for detailed description in connection with a counting apparatus, it is not necessarily limited to use with such mechanism. The embodiment of the invention disclosed should be taken as an illustration rather than a restriction thereof.

What is claimed is:

1. In combination, an input circuit, a load circuit, a gaseous device connecting said circuits and including a control grid, a screen grid and a cathode, said control grid being connected to said input circuit, means for applying a preselected voltage to said cathode, and means for controlling the ionization of said device, said controlling means comprising means for applying a voltage of predetermined magnitude to said screen grid, said device being adapted to ionize in response to the predetermined screen grid voltage and a voltage of certain magnitude applied from said input circuit to said control grid at the same time, a first diode including a cathode and an anode for limiting the screen voltage to the predetermined magnitude, said first diode having its anode connected to a point common to said screen grid and said predetermined voltage means, said first diode having its cathode connected to a point common to said preselected voltage means and said first-mentioned cathode, and a second diode including a cathode and an anode for limiting the voltage applied to said control grid to the certain magnitude, said second diode having its anode connected to a point common to said input circuit and said control grid, said second diode having its cathode connected to a point common to said preselected voltage means and said first-mentioned cathode, such limitation of the screen grid and control grid voltage tending to control the ionization of said device.

2. A system for counting the number of time intervals during a given testing period in which a voltage of varying magnitude in a circuit attains at least a certain magnitude comprising in combination a counting mechanism having an operating winding and a normally open contact having a non-grounded side and a grounded side, a first capacitor connected in shunt to said winding, a gaseous discharge device including a control grid connected to said circuit, a screen grid, a cathode and an anode, a source of alternating voltage connected through said winding and capacitor to said anode and cathode, timing means for applying the alternating source to said anode and cathode for the given testing period, means for applying a preselected voltage to said cathode, a second capacitor for applying a voltage of a predetermined magnitude to said screen grid, said second capacitor having one terminal grounded and its opposite terminal connected to said screen grid and said non-grounded side of said contact, means connected to said last-mentioned terminal for charging said second capacitor to the predetermined voltage in a certain time interval, said second capacitor being charged and discharged under control of said mechanism, a first diode having its plate connected to said charging means and said opposite terminal of said second capacitor and its cathode to a point common to said preselected voltage means and said cathode of said device for limiting the charge on said second capacitor substantially to the predetermined magnitude, a second diode having its plate connected to a point common to said control grid and input circuit and its cathode to a point common to said preselected voltage means and said cathode of said device for limiting the input voltage applied to said control grid to the certain magnitude, said first capacitor being charged by a predetermined number of successive positive half-cycles of the alternating voltage when the predetermined and certain voltages are simultaneously applied to said control grid and screen grid, respectively, to institute ionization in said device, said first capacitor tending to discharge through said winding on the successive negative half cycles of the alternating voltage until said mechanism is operated to close said normally open contact whereby ground potential is applied to said screen grid and to said second capacitor and whereupon said second capacitor is caused to discharge, said first and second diodes limiting the operations of said mechanism to a predetermined maximum number in the given testing period, said second capacitor taking on the predetermined charge during the next succeeding certain charging time interval therefor upon the restoration of said normally open contact when said mechanism is returned to the unoperated condition due to the discharge of said first capacitor, each operation of said mechanism recording one time interval in which the voltage in said circuit attained at least the certain magnitude, and the total number of operations of said mechanism recording the number of time intervals in which the voltage in said circuit attained at least the certain magnitude during the given testing period.

3. In combination, an input circuit having a voltage of at least a certain magnitude, a counting mechanism having an operating winding and a capacitor in shunt thereto, a gaseous discharge device having a control grid, a screen grid, a cathode and an anode, said control grid being connected to said input circuit, a source of alternating current connected to said cathode and anode and including said winding and capacitor therebetween, means for applying a voltage of predetermined magnitude to said screen grid to cause said device to ionize on a positive half-cycle of the alternating voltage when the certain voltage being applied to said control grid from said input circuit at the same time has a magnitude substantially equal to the predetermined magnitude of said screen grid voltage whereby said capacitor is caused to take on a charge, said capacitor dissipating its charge in said winding to operate said mechanism as said device is deionized on the next succeeding half-cycle of the alternating voltage whereby said mechanism is caused to record that at least the certain voltage occurred in said input circuit, means for applying a preselected voltage to said cathode of said device, and means for controlling the predetermined voltage applied to said screen grid, said last-mentioned means comprising a diode having an anode and a cathode, said last-mentioned anode being connected to a point which is common to said screen grid and said predetermined voltage means, said last-mentioned cathode being connected to a point which is common to said cathode of said device and said preselected voltage means.

4. In combination, an input circuit having a voltage of at least a certain magnitude, a counting mechanism having an operating winding and a capacitor in shunt thereto, a gaseous discharge device having a control grid, a screen grid, a cathode and an anode, said control grid being connected to said input circuit, a source of alternating current connected to said cathode and anode and including said winding and capacitor therebetween, means for applying a voltage of predetermined magnitude to said screen grid to cause said device to ionize on a positive half-cycle of the alternating voltage when the certain voltage being applied to said control grid from said input circuit at the same time has a magnitude substantially equal to the predetermined magnitude of said screen grid voltage whereby said capacitor is caused to take on a charge, said capacitor dissipating its charge in said winding to operate said mechanism as said device is deionized on the next succeeding half-cycle of the alternating voltage whereby said mechanism is caused to record that at least the certain voltage occurred in said input circuit, means for applying a preselected voltage to said cathode of said device, and means for controlling the certain voltage applied to said control grid, said last-mentioned means comprising a diode including an anode and a cathode, said last-mentioned anode being connected to a point which is common to said control grid and input circuit, said last-mentioned cathode being connected to a point which is common to said cathode of said device and said preselected voltage means.

5. A system for counting the number of time intervals in a given testing period in which a voltage in a circuit attains at least a certain magnitude comprising in combination a gaseous discharge device having a control grid connected to said circuit, a screen grid, a cathode, and an anode, a counting mechanism including an operating winding, a counter actuable by said winding, and a capacitor in shunt to said winding, a source of alternating voltage connected to said anode and cathode and including said winding and capacitor therebetween, timing means for effectively applying said source to said anode and cathode for a given testing period, means for applying a voltage of predetermined magnitude to said screen grid at recurrent time intervals under control of said mechanism, said device alternately ionizing and deionizing on successive positive and negative half-cycles of the alternating voltage when the predetermined and certain voltages are applied to said screen grid and control grid, respectively, at the same time, substantially with the same magnitude, said capacitor charging during the ionization of said device and discharging in said winding during the deionization of said device whereby said mechanism is operated to actuate said counter and to control the recurrent time intervals of said predetermined voltage means, means for effectively dividing the given testing period into a plurality of discrete time intervals, each of the same minimum duration, in which said capacitor is capable of taking on sufficient charge to operate said mechanism, each actuation of said counter recording one time interval in which the voltage in said circuit attained at least the certain magnitude, and the total number of actuations of said counter recording the total number of time intervals in which the voltage in said circuit attained at least the certain magnitude during the given testing period, said dividing means comprising a pair of diodes each having an anode and a cathode, the anode of one diode being connected to said screen grid and said voltage means, and the cathode of said one diode being connected to said cathode of said device, said one diode tending to limit the voltage applied to said screen grid to the predetermined magnitude, the anode of the second diode being connected to said input circuit and said control grid of said device, and the cathode of said second diode being connected to said cathode of said device, said second diode tending to limit the voltage applied to said last-mentioned control grid to the certain magniutde.

6. A system for counting the number of time intervals during a given testing period in which a voltage in a circuit attains at least a certain magnitude comprising in combination a gaseous discharge device having a control grid connected to said circuit, a screen grid, a cathode and an anode, a counting mechanism having an operating winding and a capacitor connected in shunt thereto, said mechanism having a normally open contact which has one side grounded, a source of alternating voltage connected to said anode and cathode and including said winding and capacitor therebetween, timing means for applying said alternating source to said anode and cathode for the given testing period, means for applying a voltage of predetermined magnitude to said screen grid at recurrent time intervals under control of said mechanism, circuit means for connecting the non-grounded side of said contact to said screen grid and said voltage means therefor, said device alternately ionizing and deionizing on a predetermined number of successive positive and negative half-cycles of the alternating voltage in response to the application of the certain and predetermined voltages to said control and screen grid, respectively, at the same time, and with substantially the same magnitude, said capacitor being charged during the ionization of said device and tending to discharge through said winding during the deionization of said device until said mechanism is operated whereby said contact is closed to apply ground to said screen grid and said voltage means to effectively disconnect said voltage means from said screen grid, said voltage means being reapplied to said screen grid for the next succeeding time interval upon the restoration of said normally open contact when said mechanism is returned to the unoperated condition due to the discharge of said capacitor, each operation of said mechanism recording one time interval in which the voltage in said circuit attained at least the certain magnitude, the total number of operations of said mechanism recording the total number of time intervals in which the voltage in said circuit attained at least the certain magnitude during the given testing period, and means for limiting the operations of said mechanism to a predetermined maximum number in the given testing period, said limiting means including a pair of non-linear elements, one element being effectively connected in shunt to said predetermined voltage means for limiting the voltage applied to said screen grid to the predetermined magnitude, and the second element being effectively connected in shunt to said input circuit for limiting the voltage applied to said control grid to the certain magnitude.

7. In combination, an input circuit having a voltage of at least a certain magnitude, a counting mechanism having an operating winding and a capacitor in shunt thereto, a gaseous discharge device having a control grid, a screen grid, a cathode and an anode, said control grid being connected to said input circuit, a source of alternating current connected to said cathode and anode and including said winding and capacitor therebetween, means for applying a voltage of predetermined magnitude to said screen grid to cause said device to ionize on a positive half-cycle of the alternating voltage when the certain voltage being applied to said control grid from said input circuit at the same time has a magnitude substantially equal to the predetermined magnitude of said screen grid voltage whereby said capacitor is caused to take on a charge, said capacitor dissipating its charge in said winding to operate said mechanism as said device is deionized on the next succeeding half-cycle of the alternating voltage whereby said mechanism is caused to record that at least the certain voltage occurred in said input circuit, means for applying a preselected voltage to said cathode of said device, means for controlling the predetermined voltage applied to said screen grid, said last-mentioned means comprising a diode having an anode and a cathode, said last-mentioned anode being connected to a point which is common to said screen grid and said predetermined voltage means, said last-mentioned cathode being connected to a point which is common to said cathode of said device and said preselected voltage means, means for applying a preselected voltage to said cathode of said device, and means for cnotrolling the certain voltage applied to said control grid, said last-mentioned means comprising a diode including an anode and a cathode, said last-mentioned anode being connected to a point which is common to said control grid and input circuit, said last-mentioned cathode being connected to a point which is common to said cathode of said device and said preselected voltage means.

LESTER Y. LACY.

REFERENCES CITED

The following references are of record in the file of this patent:

UNITED STATES PATENTS

| Number | Name | Date |
|---|---|---|
| 2,098,041 | Hoppe | Nov. 2, 1937 |
| 2,153,172 | Buschbeck | Apr. 4, 1939 |
| 2,192,189 | Haffcke | Mar. 5, 1940 |
| 2,286,442 | Schock | June 16, 1942 |
| 2,304,552 | Deerhake | Dec. 8, 1942 |
| 2,404,643 | Livingston | July 23, 1946 |
| 2,407,505 | Michel | Sept. 10, 1946 |
| 2,435,414 | Sziklai | Feb. 3, 1948 |
| 2,436,835 | Stutsman | Mar. 2, 1948 |
| 2,436,872 | Smith | Mar. 2, 1948 |
| 2,443,398 | Neff | June 15, 1948 |
| 2,444,210 | Lauricella | June 29, 1948 |
| 2,448,422 | Davis | Aug. 31, 1948 |
| 2,459,846 | Smyth | Jan. 25, 1949 |
| 2,515,477 | Tellkamp | July 18, 1950 |
| 2,515,677 | Usselman | July 18, 1950 |